C. M. EASON & R. O. HENDRICKSON.
TRACTOR ENGINE.
APPLICATION FILED NOV. 1, 1913.
1,205,982.
Patented Nov. 28, 1916.
13 SHEETS—SHEET 1.
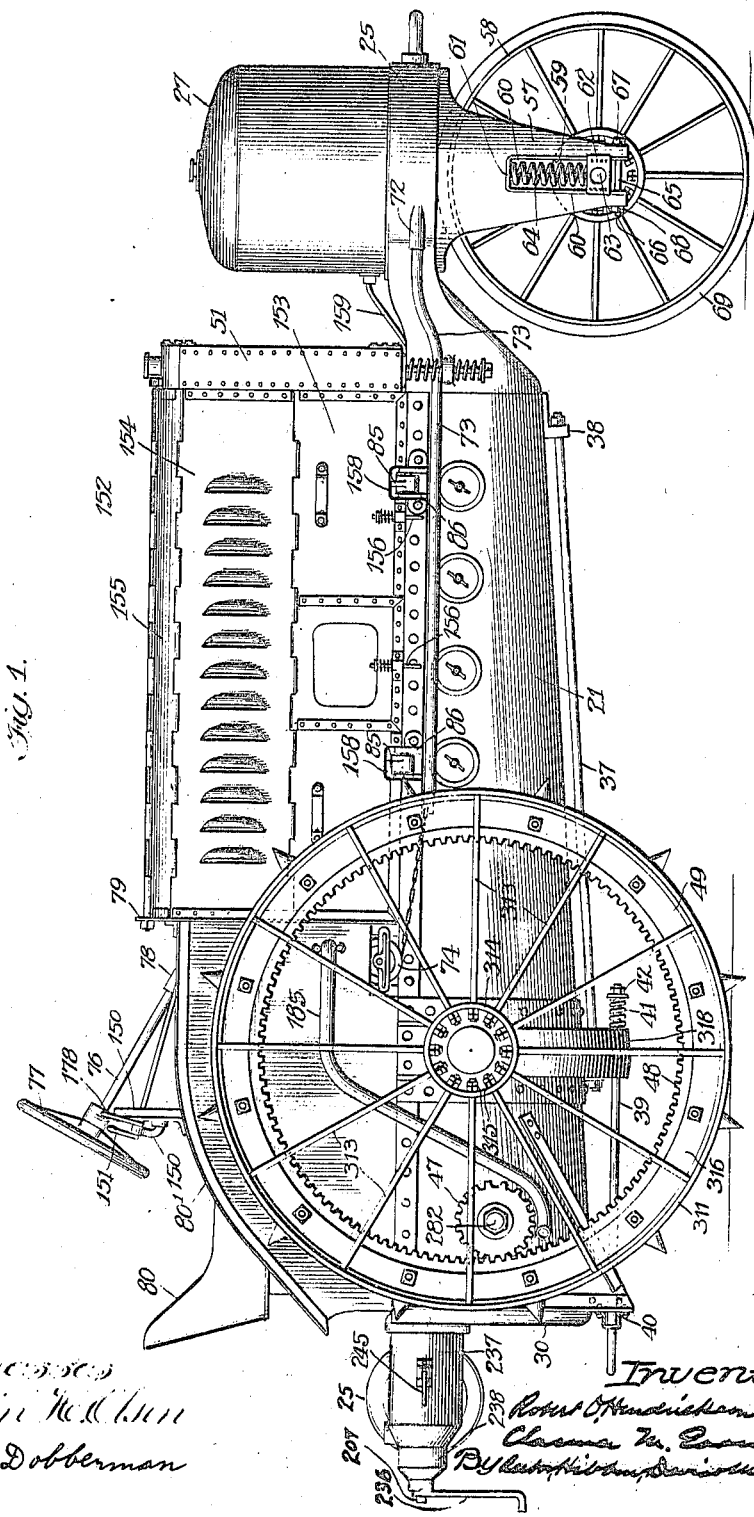

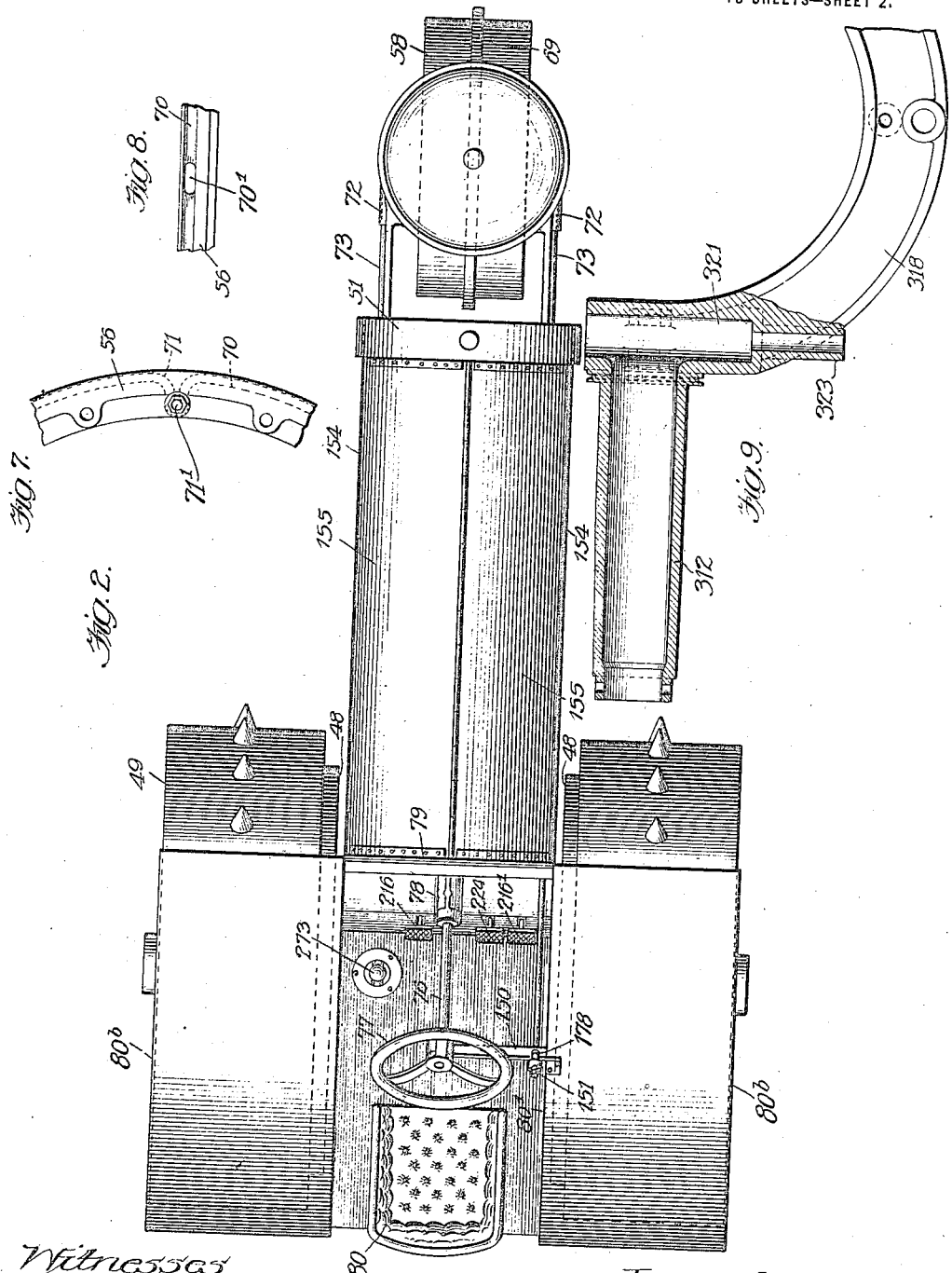

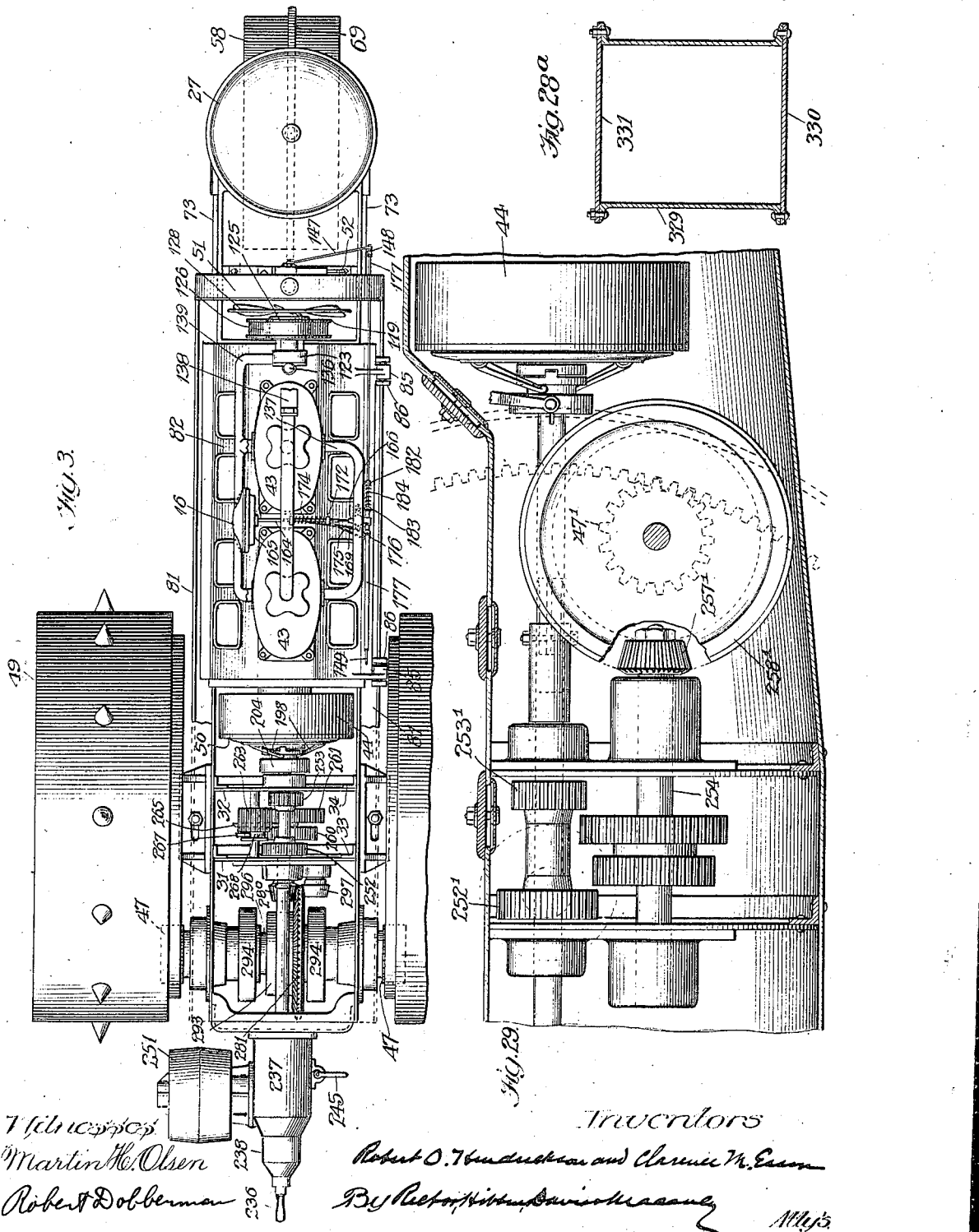

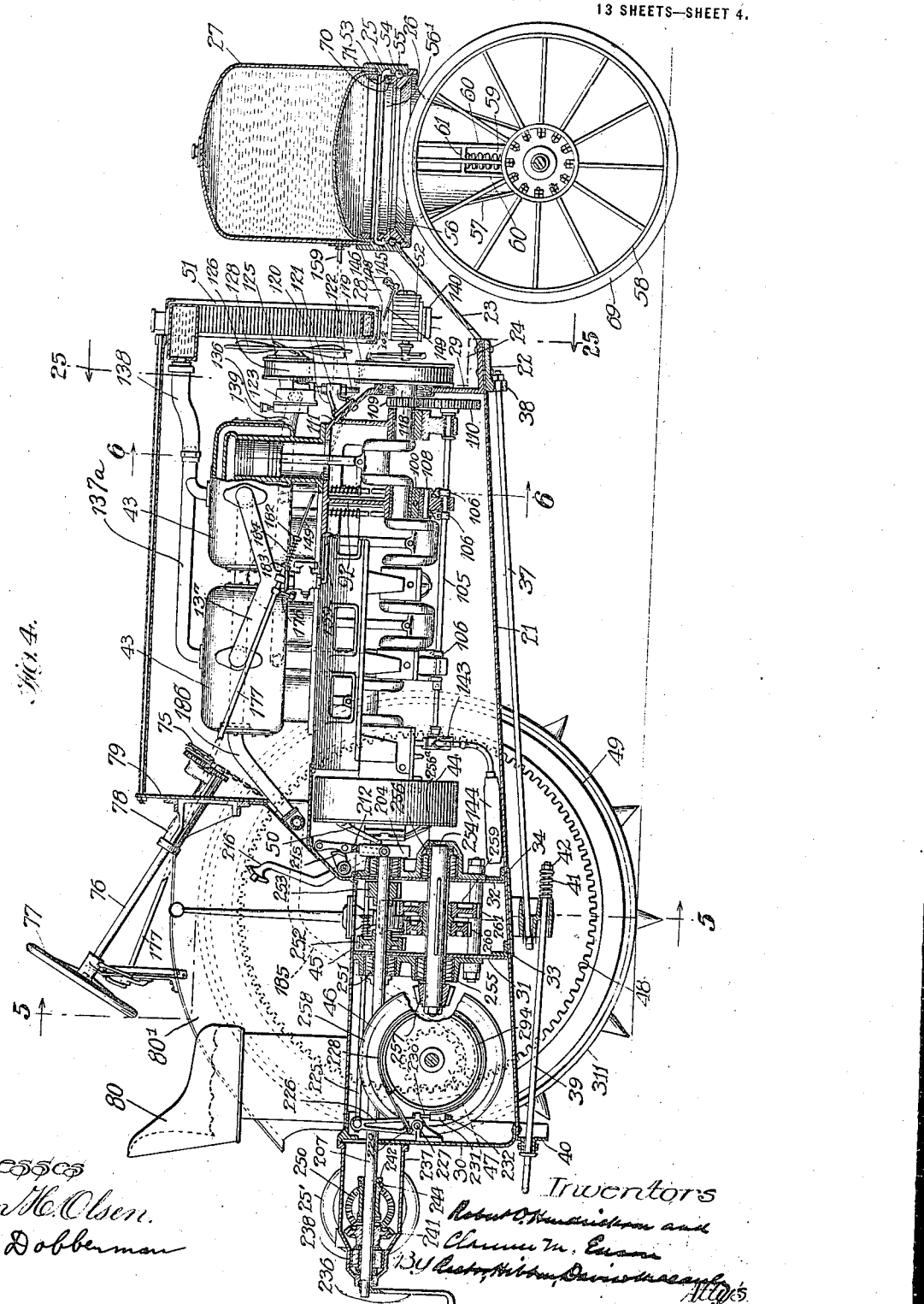

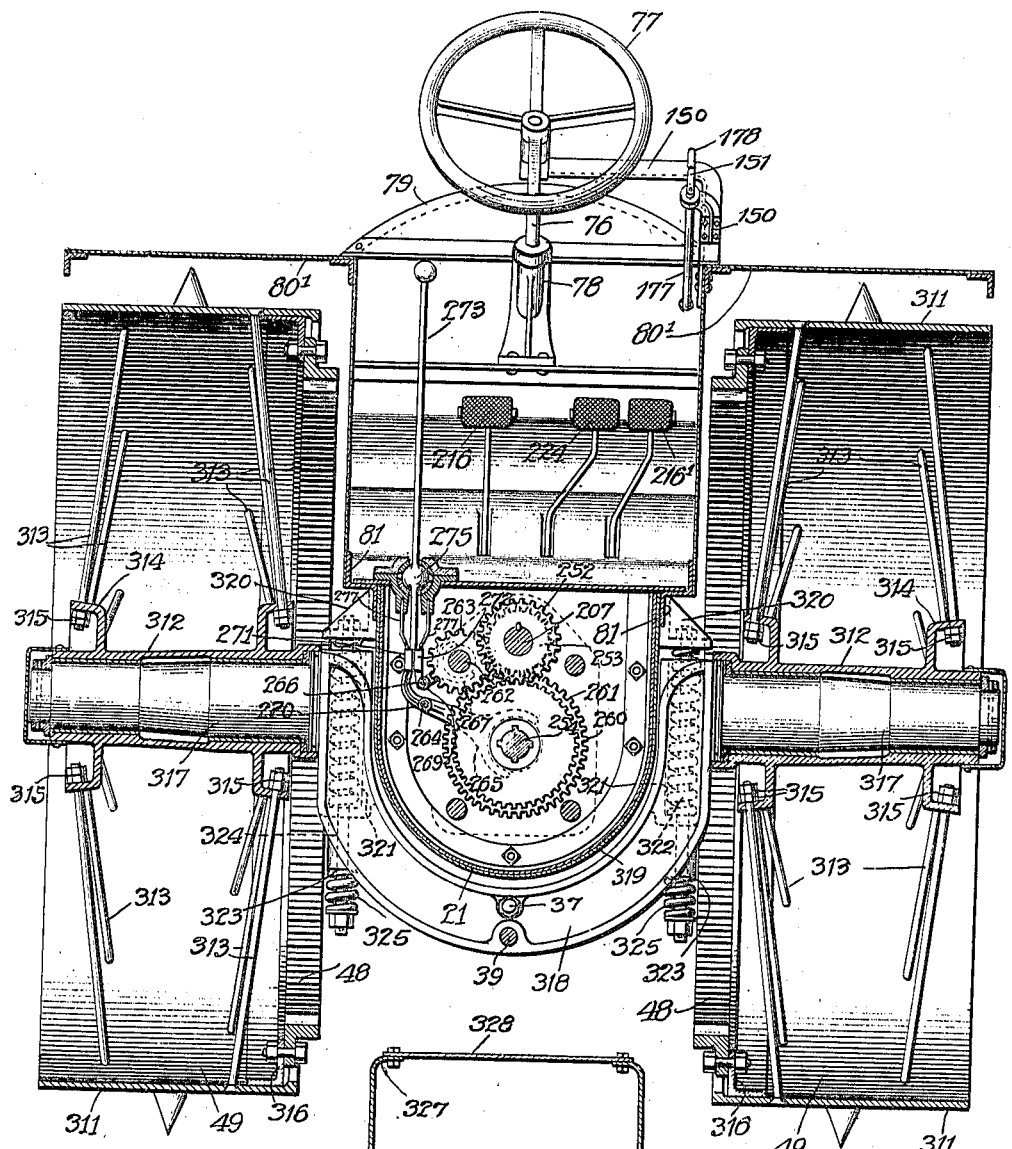

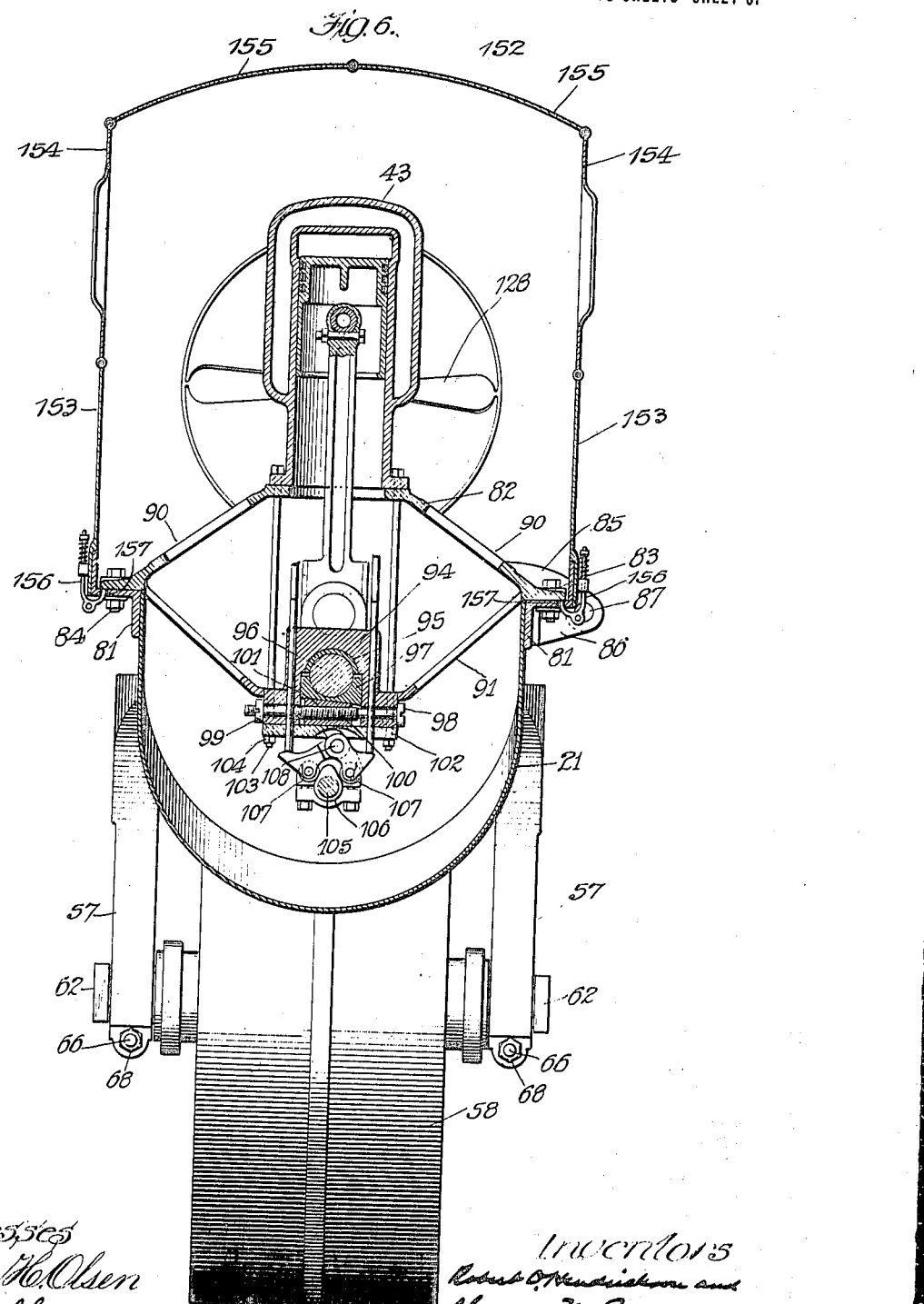

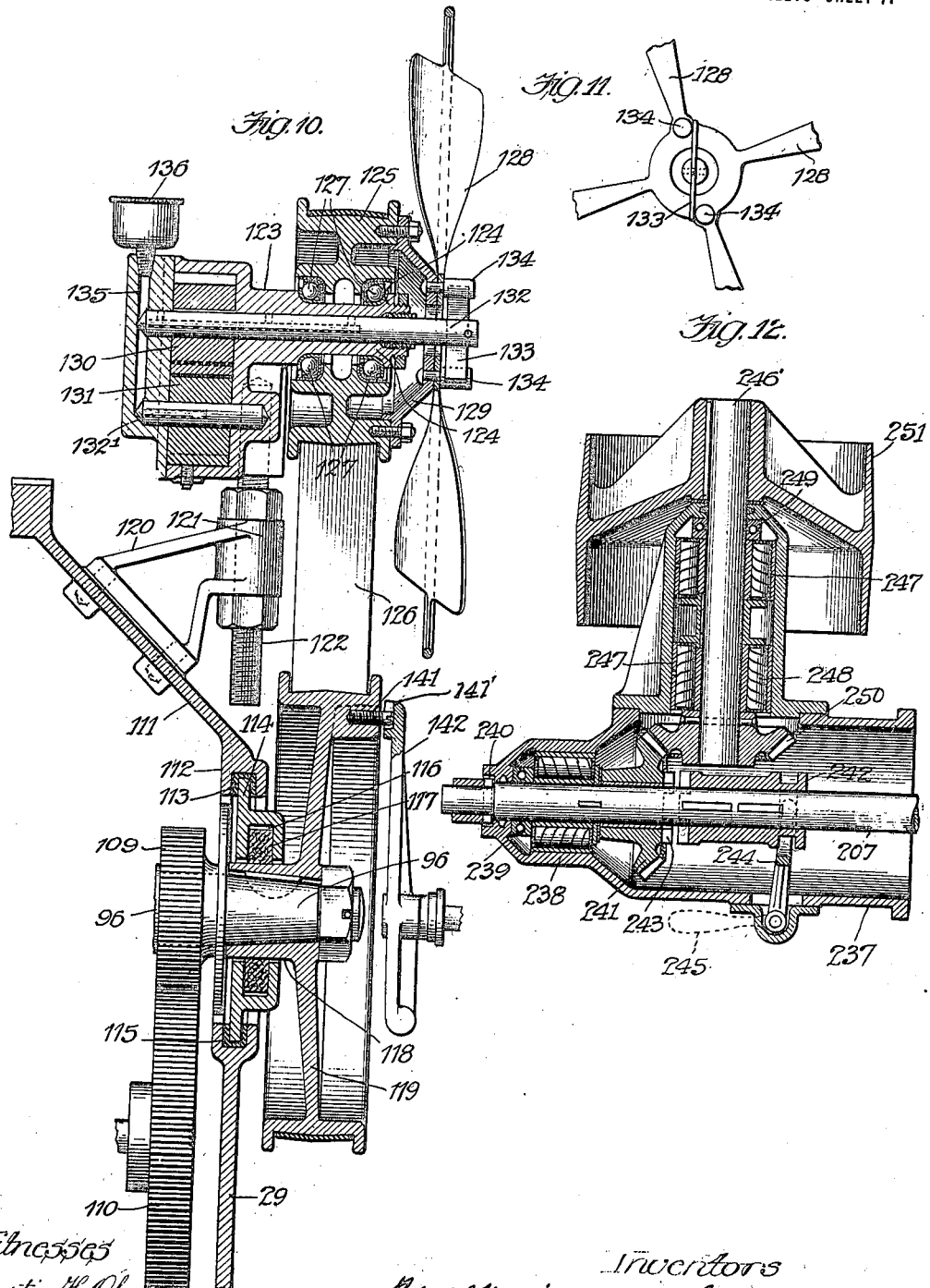

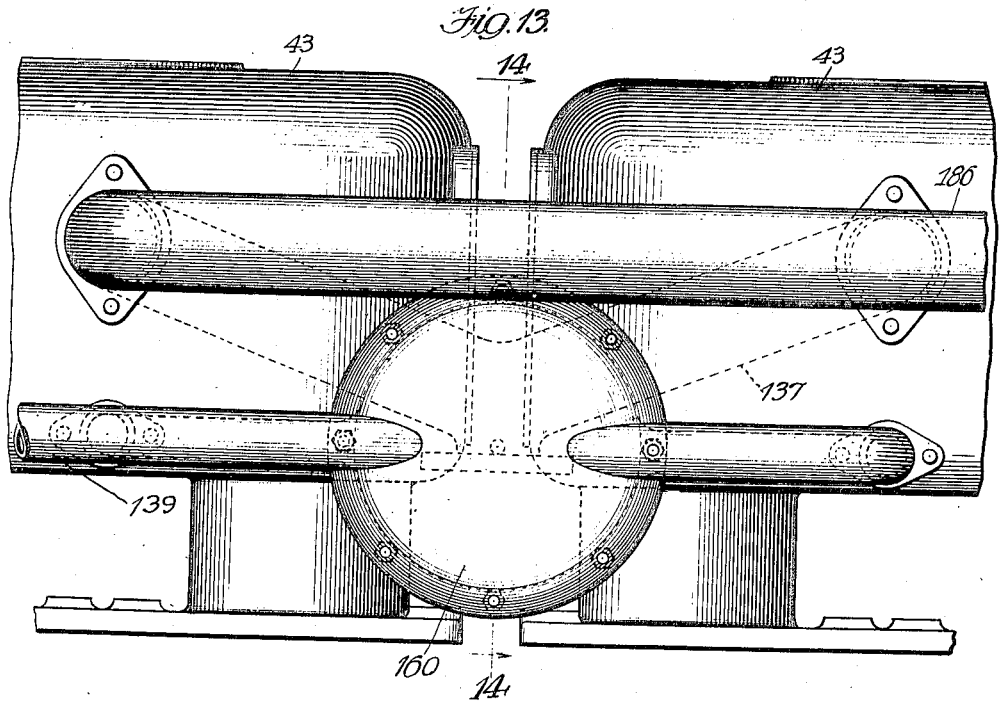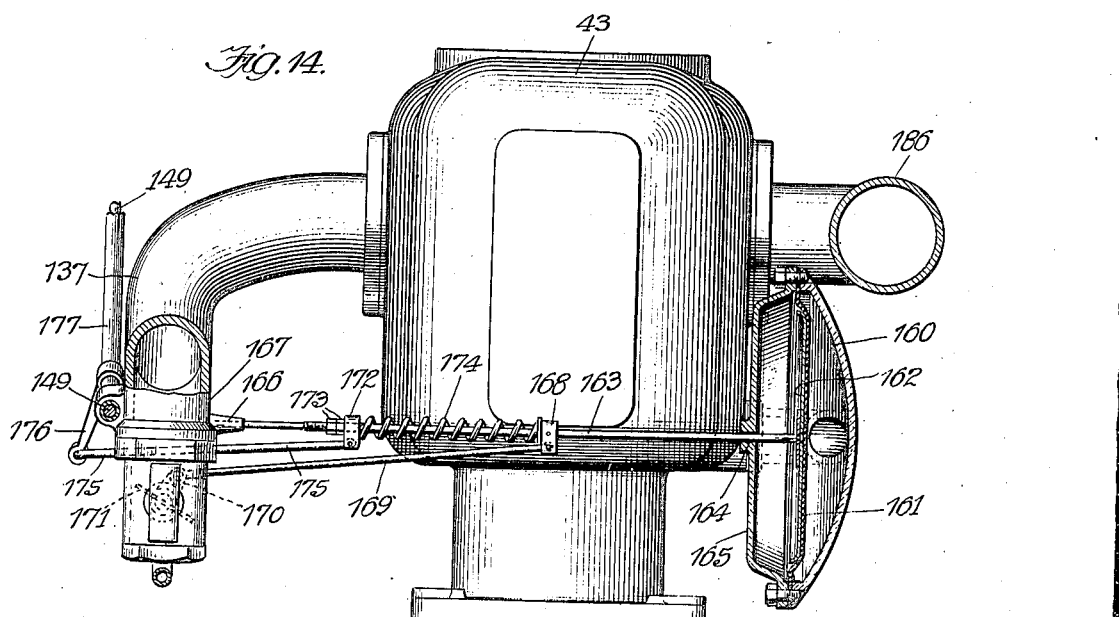

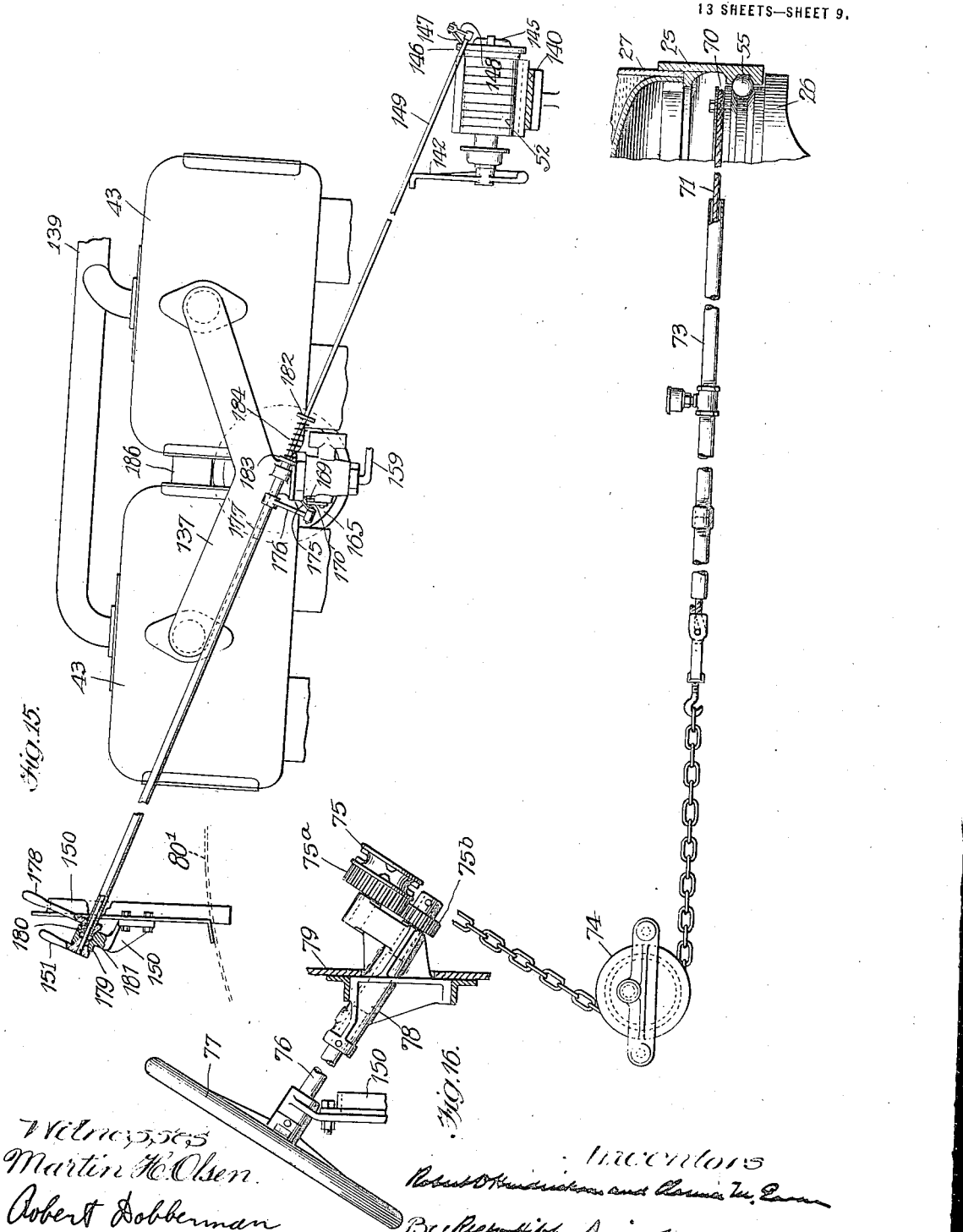

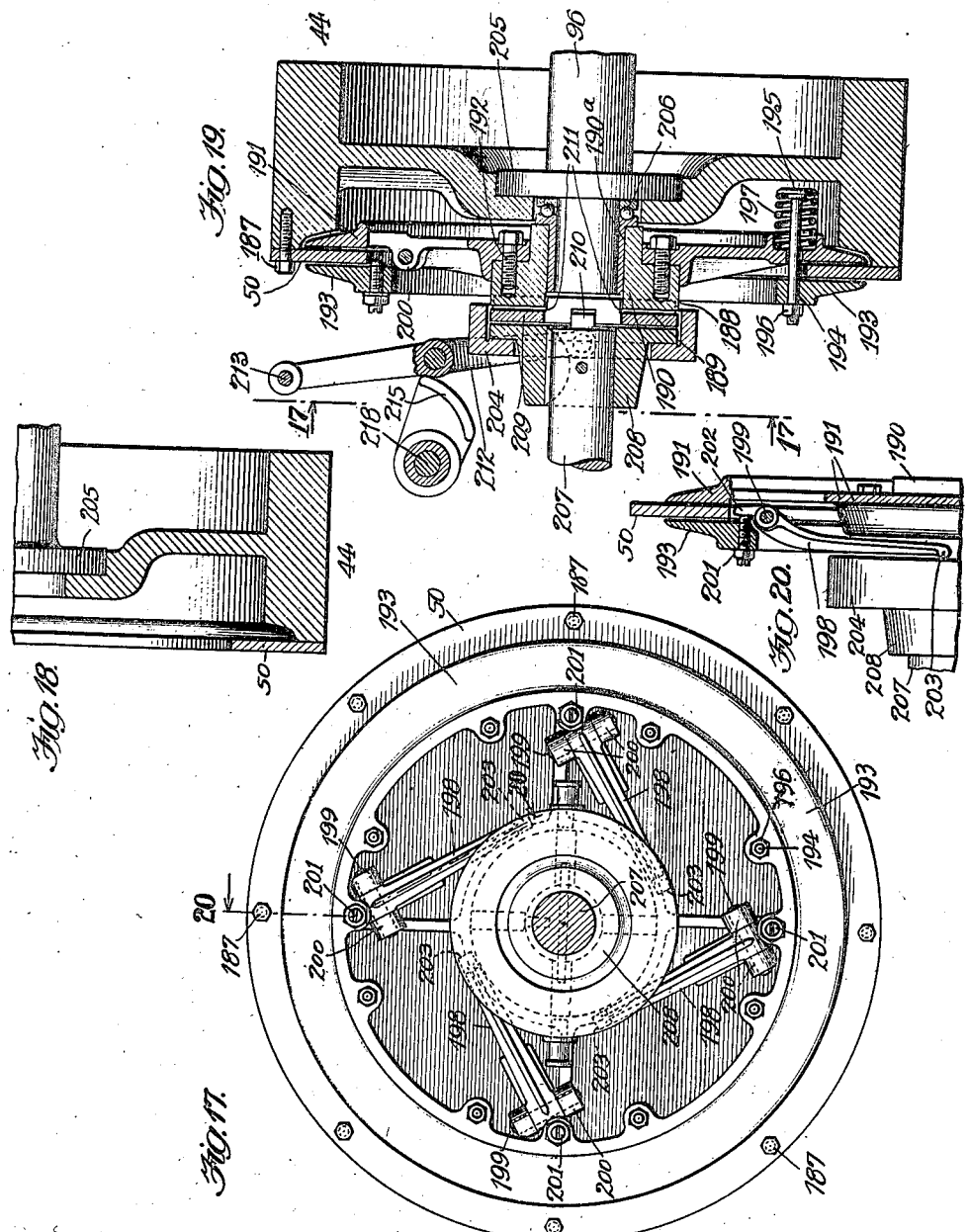

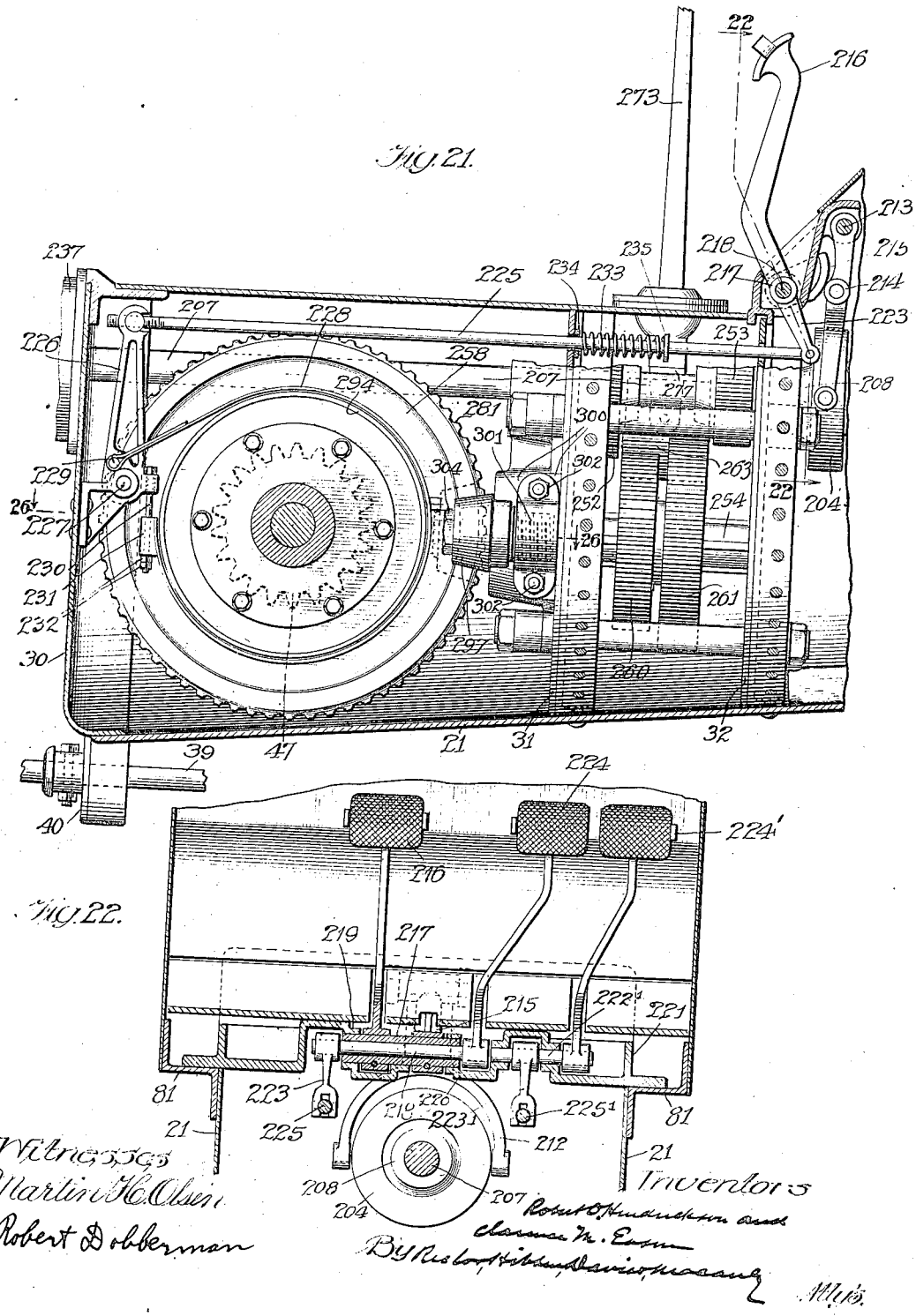

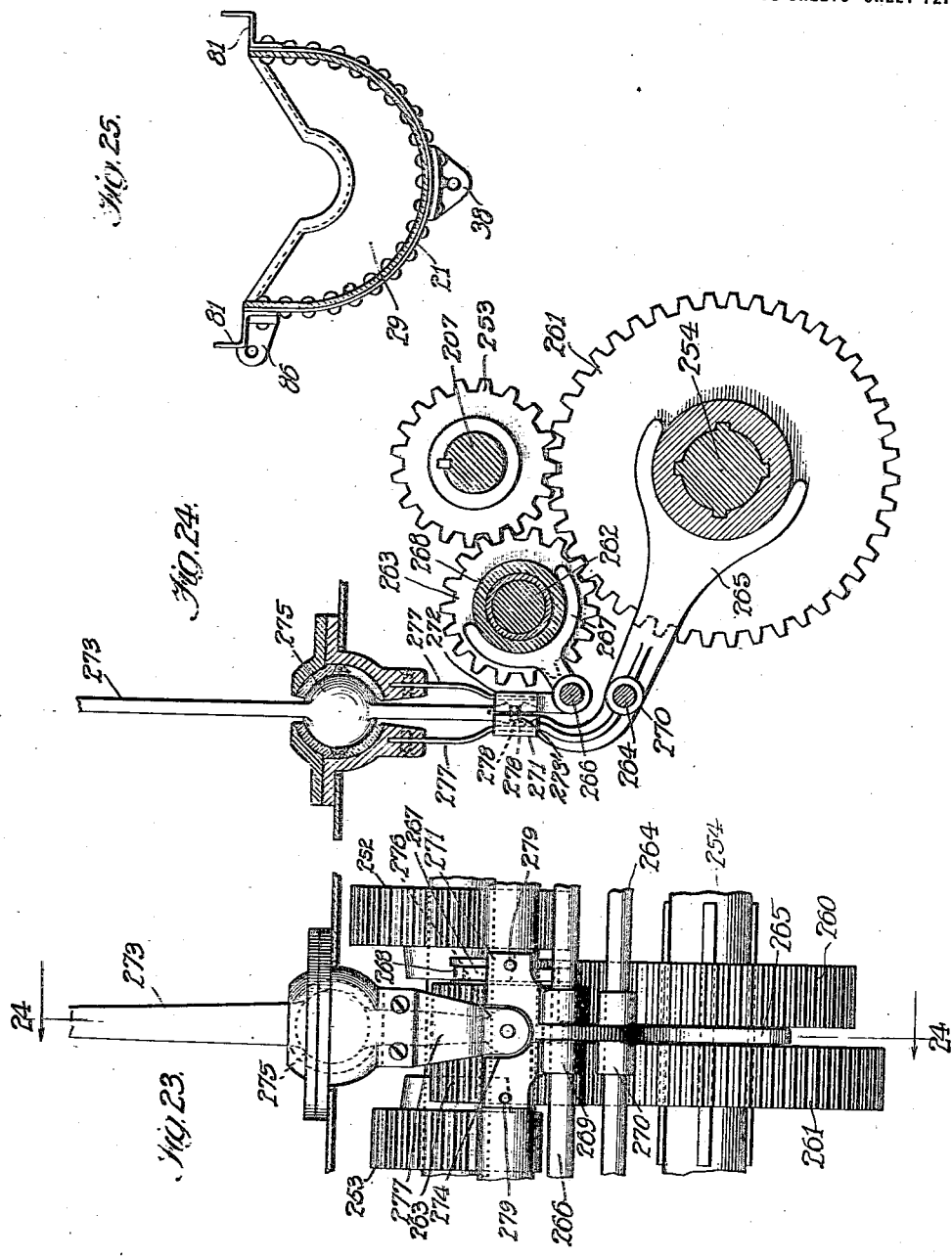

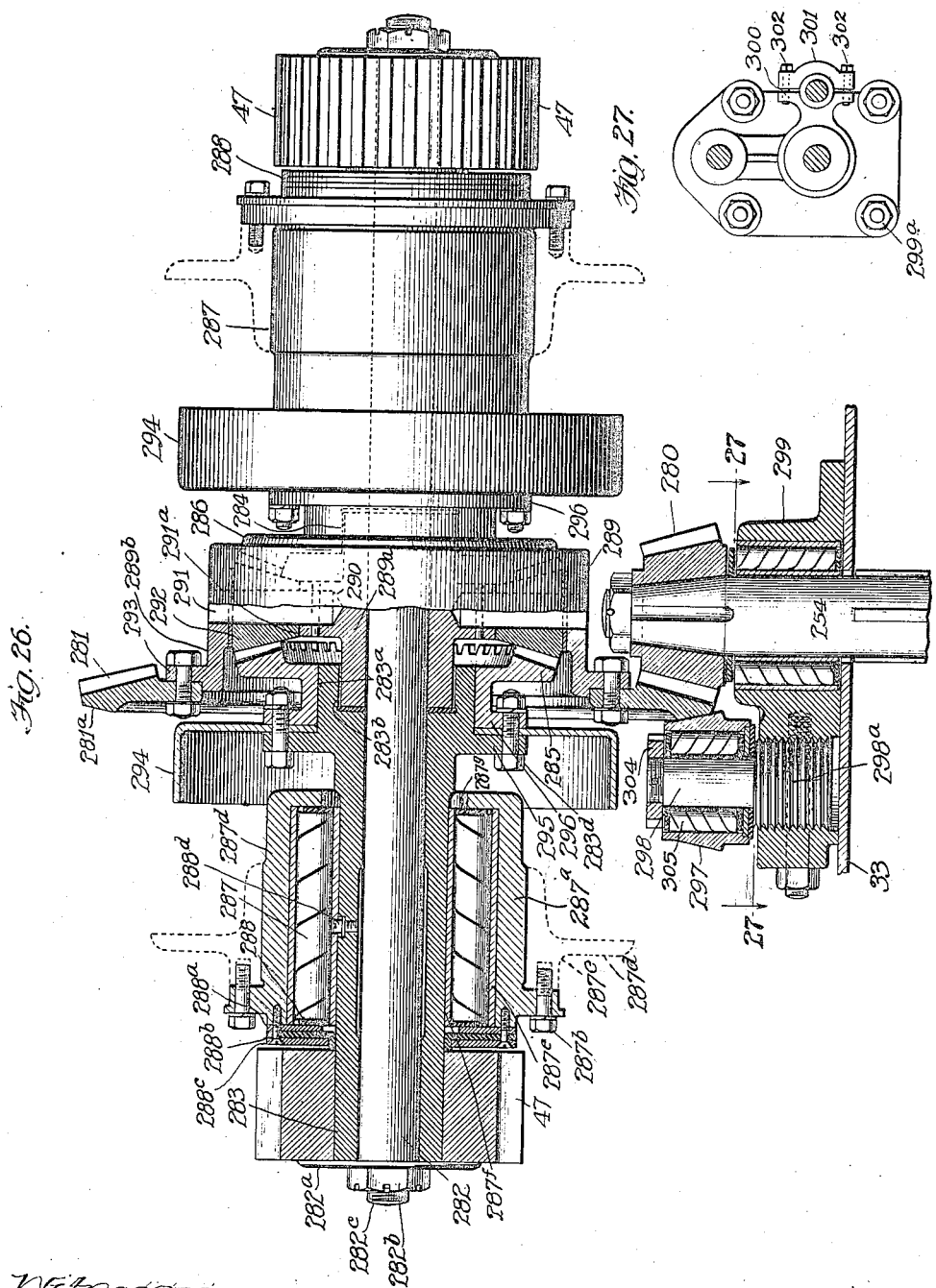

UNITED STATES PATENT OFFICE.

CLARENCE M. EASON AND ROBERT O. HENDRICKSON, OF CLEVELAND, OHIO, ASSIGNORS TO WALLIS TRACTOR COMPANY, OF RACINE, WISCONSIN, A CORPORATION OF WISCONSIN.

TRACTOR-ENGINE.

1,205,982.  Specification of Letters Patent.  Patented Nov. 28, 1916.

Application filed November 1, 1913. Serial No. 798,687.

*To all whom it may concern:*

Be it known that we, CLARENCE M. EASON and ROBERT O. HENDRICKSON, citizens of the United States, residents of Cleveland, in the county of Cuyahoga and State of Ohio, have invented certain new and useful Improvements in Tractor-Engines, of which the following is a specification.

Our invention relates more particularly to tractor engines, the motive power of which is supplied by means of gasolene or other hydrocarbon engines and each of which, therefore, includes in its construction, in addition to the frame, ground wheels and motors, steering means, a radiator, a water circulation pump, and a clutch, a transmission and differential between the motors and the traction wheels.

The invention concerns more particularly the general construction of such a tractor engine and a number of the features thereof, and has for its purpose and object to increase the strength and rigidity of the frame and other parts while at the same time substantially decreasing the weight thereof and providing a simpler and more compact construction than those of the prior art and the parts of which shall be easily accessible for the purpose of making repairs and the like. These and other advantages which will appear from the following description are attained in our improved form of tractor engine.

In the accompanying drawings we have shown and in the following specification have described in detail a preferred form of our invention but it is to be understood that the specific disclosure is for the purpose of exemplification only and that the scope of our invention is to be gathered from the following claims in which we have endeavored to distinguish it from the prior art so far as known to us without, however, relinquishing or abandoning any portion or feature thereof.

In the drawings, Figure 1 is a side elevation of a tractor embodying my invention; Fig. 2 a plan view of the same; Fig. 3 a similar view with parts removed to show the interior construction and partly broken away on one side; Fig. 4 a central vertical section with parts shown in elevation; Fig. 5 an enlarged vertical section on the line 5—5 of Fig. 4 looking in the direction of the arrows; Fig. 6 an enlarged vertical transverse section upon the line 6—6 of Fig. 4; Fig. 7 a fragmentary view of a detail of the steering mechanism in plan; Fig. 8 a fragmentary view of the same part in side elevation; Fig. 9 a transverse section, partly in elevation, showing a detail of the rear axle construction; Fig. 10 an enlarged central, longitudinal, vertical section upon the same plane as Fig. 4 upon an enlarged scale of a portion of the apparatus only, and showing certain parts or details in section, represented in elevation in Fig. 4; Fig. 11 a front elevation of a detail shown in section in Fig. 10; Fig. 12 a horizontal central section showing a detail of the rear portion of the machine; Fig. 13 a fragmentary side elevation on an enlarged scale showing the engine bodies and the speed governor; Fig. 14 a section on line 14—14 of Fig. 13 looking in the direction of the arrows; Fig. 15 a side elevation showing the means for controlling the throttle valve of the engine and a breaker box of the magneto; Fig. 16 a detached fragmentary view partly in section, showing the steering mechanism; Fig. 17 a vertical transverse section on line 17—17 of Fig. 19, showing the clutch mechanism in elevation; Fig. 18 a fragmentary section of a detail thereof; Fig. 19 a central, vertical, longitudinal section through the clutch mechanism; Fig. 20 a section upon the broken line 20—20 of Fig. 17; Fig. 21 is a vertical central section through the rear portion of the body of the tractor showing the internal parts in elevation; Fig. 22 is a transverse section upon the planes of the broken line 22—22 of Fig. 21, looking in the direction of the arrows; Fig. 23 a fragmentary elevation on an enlarged scale of the operating parts of the transmission mechanism shown in Fig. 4; Fig. 24 a transverse section through the same mechanism on the line 24—24 of Fig. 23; Fig. 25 a transverse section upon the broken line 25—25 of Fig. 4 showing a portion of the frame of the tractor; Fig. 26 a transverse section, partly in elevation, upon the line 26—26 of Fig. 21, showing the differential mechanism; Fig. 27 a view at right angles thereto, on the line 27—27 of Fig. 26; Figs. 28 and 28ᵃ transverse sections of modified forms of tractor body to be referred to later; and Fig. 29 shows in vertical section and partly in elevation, a modified arrangement of the transmission differential and clutch.

Referring now more particularly to Figs. 1, 2 and 5, it will be seen that the main frame of the tractor comprises a longitudinal trough-shaped body member or frame 21 which is preferably U-shaped in cross-section, as seen in Fig. 5, and may be formed from a single sheet of boiler plate or the like, bent or curved to the shape shown in said figure by die-pressing or other means, the side walls of the trough being substantially parallel as shown in Fig. 3, but the depth of the trough increasing from the front to the rear of the machine (see Fig. 4), providing an inclined bottom to the trough though the upper edges thereof are substantially horizontal in the machine as assembled. While the form just described is that preferred by us, the longitudinal body member of the tractor may, if desired, be built up of several longitudinal members and may be rectangular in cross-section, an example of this form of construction being seen in Fig. 28, or the bottom of the trough may be horizontal, the form shown in Figs. 1, 2 and 5, however, being that considered most desirable. The main feature of this element, however, which is common to both of the described forms, is that it is a continuous trough, which as shown in Fig. 4, supports and substantially incloses practically all the working parts, which in previous constructions are more or less exposed to injury and the accumulation of dirt, and forms an oil pan common to the same. At its forward end the body member is secured as by riveting to a cast or forged head 23, called hereinafter the forward casting, which for the purpose of attachment to the body member comprises a hollow shoulder portion 24, the cross-sectional shape of which conforms to that of the end of the trough-shaped body member to which it is secured (see Figs. 4 and 25). At its forward end said casting is in the form of a ring or hollow cylinder 25 which receives the steering head 26 of the machine and also supports the fuel tank 27, both of which will be described later, the connection between the shoulder portion 24 and the cylinder having the form of a hollow, troughlike, tapering neck 28 which in the assembled machine, as shown in Fig. 1, inclines upwardly from the shoulder to the cylinder. At its rearward end the casting is formed with an interior, transverse web or flange 29 having a semi-circular recess in its upper edge, which web forms part of a baffle and front inclosing wall for the motor, as will be more fully hereinafter described (see Figs. 4, 10 and 25). The rear end of the body member is closed by a flanged plate 30, the flanges of which extend within said body member and are preferably attached thereto by rivets or otherwise, and at suitable intervals in its length the trough of the body member is provided with transverse plates or partitions 31, 32 secured thereto by riveted flanges 33, 34 and which serve not only as cross braces or bridges for the trough but also to support the working parts and to conveniently divide the trough into chambers. As best seen in Fig. 1 the trough-shaped body member not only serves as a frame and protection for the movable parts of the machine, but also as an oil pan and the partitions, in addition to their functions stated above, properly determine the location of the pools of lubricating oil with reference to the mechanisms which they serve.

The general arrangement of the operating mechanism within the body member is best shown in Fig. 4. The motor engines 43, 43 of any suitable or approved design are mounted at the forward end of the body member, the fly wheel therefor being shown at 44, and the transmission or speed changing mechanism at 45. In the preferred form of our invention the differential is located rearward of the transmission as seen at 46, Fig. 4, and drives a pair of bull pinions 47, 47, which engage interior gears 48, 48 upon the rear ground or traction wheels 49, 49 (see Figs. 4, 5, and 26). While this is our preferred construction, the bull pinions and differential may be located forwardly of the transmission, as shown in Fig. 29, and this construction has certain advantages, particularly in connection with very heavy machines by reason of the stress and strain upon the parts as will be more fully explained at a later point in this specification. The driving member 50 of the clutch mechanism is mounted directly upon the fly wheel (see Figs. 4 and 19), and the radiator 51 and magneto 52 upon the forward casting 23, as seen in Fig. 4.

The forward or neck casting 23, as has been stated, is formed with a ring or cylinder 25 which supports the fuel tank and receives the steering head. The fuel tank 27 is preferably circular to conform to the ring and may be made in any suitable manner resting at its lower end upon an annular shoulder 53 formed upon the inner wall of the cylinder casting. Near its lower end said cylinder is formed or provided with an interior groove 54 which forms a race for balls 55 interposed between said cylinder and the reduced upwardly extending portion 56 of the steering head. The latter consists of a casting comprising a hollow circular head annularly rabbetted to extend within the stationary casting 25, and a pair of forks 57, the members of which extend downward upon opposite sides of the guide wheel 58, as seen in Figs. 1, 4 and 6. Each of the forks 57 is cast with a slot 59 open at its lower end, faced on either side with flanges 60, 60, and having an end flange 61, the whole forming a boxing for the sliding bearing block 62 in which the corresponding end of the guide wheel axle 63 is journaled. Between said sliding block and the end flange 61, in each fork, is mounted a heavy compression spring 64, the springs together serving to ease the connection of the front axle to the steering head and cushion the jar caused by irregularities of the ground over which the guide wheel travels. The lower end of the slot, which as above described is cast open, is closed after the bearing blocks and wheel axle are in place by spacing sleeves 65 through which bolts 66 extend, said bolts being provided with heads 67 and nuts 68 to hold the same in place. As shown, the front or guide wheel is provided with a central annular rib 69 to secure a firmer hold upon the ground over which the tractor travels (see Figs. 4 and 25), and the steering head and wheel are free to turn upon a vertical axis upon the ball bearing within the casting 25. In order to turn said head, to the annular portion of the same within the stationary casting is bolted an annulus 56', closing the top of the ball race and formed with a groove 70 to receive a wire cable or chain 71 (see Figs. 4, 7 and 8) which surrounds said head and is secured against motion circumferentially of said head by being passed through a hole 70' in said annulus and around a pin or bolt 71'. Said cable extends through openings or passages 72, 72 formed in opposite sides of the cylindrical casting and closed guides 73, 73 to idler pulleys 74, 74, likewise upon opposite sides of the machine, and thence to a pulley or sprocket 75 upon a gear 75ª journaled in bracket 78 and engaging pinion 75ᵇ upon the steering shaft 76. The periphery of the pulley is made to fit the links of the chain in a usual or obvious manner to prevent relative slip (see Figs. 4 and 16). The steering shaft is provided with the usual hand steering wheel 77 and is journaled in bracket 78 attached to the end wall 79 of the engine housing. The bracket comprises a sleeve set at an angle to the securing plate thereof and which receives the shaft, and the end wall of the housing is formed with suitable openings for the passage of the chain or cable.

A seat 80 convenient to the steering wheel and to the various levers and controls is provided for the operator as shown in Fig. 4 and upon each side thereof wheel guards 80' protect the operator from dust, etc.

The construction by which the body of the tractor is suspended from the rear or tractor wheels will now be described with reference particularly to Figs. 1, 4, 5, and 9.

The wheels 49, 49 may be constructed in any usual or preferred manner and as shown, each consists of a broad rim 311 connected to a hub 312 by metal spokes 313 extending through flanges 314 formed upon the hub of the wheel and secured thereto by nuts 315. The internal racks referred to above are connected to the wheels by angle iron 316 to which they are bolted. The journals 317, 317 upon which the wheels are mounted are formed integral with a U-shaped axle forging 318 of a form to extend under and partly surround the trough-shaped body of the tractor. The latter is reinforced adjacent the axle forging by a band 319 of heavy metal preferably riveted thereto (see Figs. 1 and 5) to the upper ends of which are riveted or otherwise secured heavy angle pieces or brackets 320, 320. The axle forging 318 is formed at its opposite ends with vertically extending pockets 321, 321 (see dotted lines in Fig. 5), which receive heavy springs 322 upon which the brackets 320, 320 on the body rest, and which consequently support the body of the tractor out of immediate contact with the yoke or forging. The latter is formed with shoulders 323, 323, in line with and below the pockets and a bore concentric with each pocket and extending through the shoulder receives a bolt or rod 324, which extends through the spring in the pocket and through a perforation in the supporting bracket resting upon the spring and is provided with a head upon its upper end and a nut upon the lower end. Between the nut on the lower end of the bolt and the shoulder through which it extends is placed a compression spring 325 encircling the bolt and cushioning and limiting any upward movement of the tractor body with reference to the yoke. It will thus be seen that the tractor body is held against excessive vertical movement in either direction but sufficient movement and cushion are provided to prevent undue shocks to the mechanism.

In addition to the means heretofore described for maintaining the position of the body member relatively to the axle or U-shaped forging, the latter is formed with two transverse perforations at its lower part through which extend the rods 37 and 39, the former of which is connected to a bracket 38 riveted to the front casting and the front end of the trough-shaped member and the other of which extends to the rear of the body member where it is received by a bracket 40. A spring 41 between the yoke and the nut 42 on the forward end of the rod 39 serves to give some resiliency to the connection.

The manner of mounting the motor is best shown in Figs. 3, 4 and 6. As shown more particularly in Fig. 6, the upper edge of the body member 21 is reinforced by an angle iron 81 riveted or otherwise secured thereto, and the engines, together with the crank shaft and immediately connected parts, are mounted in a bridge member 82 provided with flanges 83 which normally rest upon the angle irons 81 and are secured thereto by bolts 84. The bridge member 82 is also formed with hinge members 85 which may be cast integral therewith, and coöperating members 86 are mounted at suitable positions on one of the angle irons 81, the hinge members on the bridge casting and angle iron respectively being secured together by pivots 87. These hinges are not essential parts of the securing means for the engine but come into service when for any reason it is desired to reach the crank shaft or other parts supported by the casting within the body member, it being only necessary for this purpose to remove the bolts securing the flanges together and tilt the entire construction, including the engine, as a unit to a convenient position to reach the desired part.
The bridge casting 82 is in the form of a truss, the inclined side plates 90, 90 of which support a horizontal plate, to which the engine cylinders are bolted. The bearings for the crank shaft 96 are severally supported from the bridge by a series of transverse webs 92, each flanged along its inclined lower edges at 91, and formed with an upwardly extending arched enlargement 94, the interior 95 of which is babbitted to form one-half of the bearing for the crank shaft 96 and which is open below and provided with suitable guides to receive a pillow block 97 which forms the other half of the crank shaft bearing (see Fig. 6). Each enlargement is cross-bored for the reception of bolts 98 which are formed at one end with heads for turning them and provided with nuts 99 at the other, the intermediate portion 100 of each bolt being threaded (see Fig. 6) to receive a wedge block 101 and adjust the same transversely of the crank shaft. By such adjustment and because of the contacting inclined faces of the pillow block and wedge block, respectively, the former may be adjusted vertically to take up wear. A cap plate 102 is secured by bolts 103 extending through the bridge casting from the cylinder flanges, and nuts 104, to the under face of each bearing enlargement and forms an under guide and support for the wedge block. This construction relieves the bridge casting from strains caused by explosions within the cylinders, the entire shock of explosion being applied directly to said cap plates through these bolts. The bearing enlargements 94 are shown in section at the right in Fig. 4 and in elevation at the left of said figure. The cap plates 102 are extended below the shaft bearings to form bearings for a cam shaft 105 which is provided with cams 106 coöperating with tappets 107, 107 mounted upon the pivots 108 for operating the valve mechanism of the engine, but as this construction is substantially shown in U. S.
Patent to Trebert, No. 980,366 of January 3, 1911, no further description thereof is necessary except to say that the cam shaft is revolved from the main shaft by gears 109, 110 on the crank shaft and cam shaft respectively, and drives the oil pump 143 which draws the oil through the filter 144 from the bottom of the trough and supplies it to the engine through ducts provided for the purpose.
At its forward end the bridge casting is inclined forwardly as at 111 to merge into a vertical plate 112 which, when the machine is assembled, is in register with the wall 29 of the front casting. In order to have a substantially dirt-proof joint at this point and at the same time provide for the extension of the crank shaft 96 to a point outside the housing a circular opening is formed at the meeting line of the walls 112 and 29 respectively, the inner periphery of the opening being grooved, as shown at 113 (Fig. 10) for the reception of a packing disk 114, the edges of which extend within said groove and are packed therein as shown at 115. The disk 114 is also provided with an opening through which the shaft 96 extends and which is grooved at 116 and provided with a packing 117 which fits closely about the hub 118 of the belt-pulley 119 which is attached to the crank shaft at this point for a purpose to be presently described.
Upon the inclined front wall of the housing is bolted a bracket 120 having a socket 121 in which is adjustably secured a pair of screw rods 122 carrying a casting 123 which forms a housing for the circulation pump, to be presently referred to, and also a bearing 124 for a pulley 125 which is driven from pulley 119, heretofore adverted to, by means of a belt 126. Ball-bearings 127, shown as of usual character, are interposed between the pulley 125 and its arbor 124 and to the outer face of said pulley a fan 128 is secured by a spider 129 which is bolted to the face of the pulley.
As heretofore stated, the casting 123 provides a housing for the circulation pump for the cooling water for the motor, said pump in the present instance being shown as of an ordinary two-gear type comprising the gears 130, 131, the latter of which is idly mounted and the former mounted upon a shaft 132 which extends at its forward end through the pulley bearing 124 and the fan, and carries a yielding blade 133 which engages studs 134, 134 on the face of the fan (see Figs. 10 and 11). Casting 123 is further formed with oil channel 135 connecting with channels in the shafts 132 and 132' to lubricate the same, a lubricant cup being shown at 136. The blade 133 by which motion is transmitted from the fan to the driven member of the rotary pump is of such strength as to readily operate the pump under normal conditions but is sufficiently weak to give way in the event of an obstruction to the rotation of the pump and save damage to the structure. By means of the adjustable rod supports 122 the belt may be adjusted as desired.

As before explained the radiator is mounted upon the front casting and it may be of ordinary construction and is in position to be affected by the air currents from the fan. It is connected to a manifold 137ᵃ leading to the water jackets of the motor by a flexible and detachable connection 138 of any suitable character and the pump is similarly connected to the lower ends of the motor water jackets by flexible and detachable connection 139, the circulation system being completed by a connection (not shown) from the pump to the radiator. The magneto is mounted directly upon a bracket 140, the armature being substantially co-axial with the crank shaft. The magneto may be of any suitable or well-known design and is driven from the crank shaft by means of a pin 141 extending from the face of pulley 119 and engaging a slot or groove 141' in the adjacent face of an arm 142 mounted upon the shaft of the armature. (See Fig. 10). By reason of the particular connection employed accurate centering of the armature shaft with relation to the crank shaft is rendered unnecessary, and the motor together with the pulley 119 may be tilted with its support for cleaning or other purposes without disturbing the magneto or making adjustments thereof.

The breaker box 145 of the magneto is adjusted by means of an arm 146 which is connected by link 147 with an arm 148 upon an oscillatory shaft 149 extending alongside the engine from a bracket 150 upon one of the side walls 80', where it is provided with a handle 151 within reach of the operator's seat for convenient manipulation of the breaker box to advance or retard the spark (see Figs. 4 and 15).

The hood 152 of the engine housing does not differ essentially from other constructions of the same kind. As shown in Figs. 1, 2, 4 and 6 it is composed of a number of articulated longitudinal sections 153, 154, 155 capable of being folded back, one upon the other, and provided along their lower edges with spring-pressed hooks 156, which are upturned at their lower ends and engage openings 157 in the angle irons 81. The hood forms with the radiator and the end wall 79 a housing which substantially incloses the motors and their immediately connected parts, and it is to be noted that the bottom section at one side is notched or cut away at 158 to provide for the hinges between the bridge which carries the engine and the frame structure.

As heretofore stated, the motors proper 43 may be of any suitable design and the same may be said of the carbureter which receives its supply of gasolene from the tank 27 through the supply pipe 159 (see Fig. 15).

In connection with the tractor illustrated we have shown a new and improved means for controlling the throttle supplying the engine with explosive mixture and though the same, *per se*, forms no part of the present invention it will be briefly described for the purpose of completeness. It may be said primarily that the throttle control is partially automatic and partially under the control of the operator and depends for its automatic control upon the pressure in the water circulation of the motor. Obviously at any point beyond the pump which causes the circulation of the water, the pressure will depend and be, roughly speaking, proportional to the speed at which the pump is driven and the latter is driven at a speed which is proportional to the number of revolutions of the main shaft to which it is geared. Having this fact in view we have inserted in the circulating system and preferably between the pump and the water jackets of the engine a chamber 160, one wall of which is formed by a flexible diaphragm 161 which is, of course, responsive to the pressure within the chamber (see Figs. 13 and 14). For the sake of convenience, we have located this chamber opposite the space between the engine units and connected the rigid backing plate 162, secured to said diaphragm, to a sliding rod 163 which extends through an opening 164 in the cover plate 165 between which and the rigid wall of the chamber 160 is clamped the edge of the flexible diaphragm 161. Said rod is further guided at its opposite end in a socket 166 formed integral with or mounted upon the fuel supply pipe 167 (see Fig. 14). A collar 168 is pinned or otherwise secured to the rod 163 and connected by a link 169 with an arm 170 upon the butterfly throttle valve 171 within the fuel supply pipe. Obviously, the extent of opening of the throttle valve depends upon the longitudinal position of the rod 163. A second collar 172 is free to slide upon the rod, subject however, to a limitation of its movement with reference thereto by a pair of set nuts 173 and a spring 174 interposed between the same and the fixed collar 168. The loose collar 172 is connected by a link 175 with an arm 176 upon a tubular shaft 177 surrounding the spark control shaft 149 before mentioned, and the position of which is controlled by a handle 178 adjacent the handle 151 and within easy reach of the operator (see Fig. 15). As seen more particularly in said figure, the handles 151 and 178 are cast with tapering bosses 179 and 180 respectively, which fit into the ends of the oppositely tapered opening 181 in the bracket 150 and the lower or forward ends of the shaft 149 and 177 are provided respectively with flanges or collars 182, 183, between which is clamped a compression spring 184 which tends to move the shafts relatively to each other longitudinally in such a sense as to cause the tapered bosses upon the handles 151 and 178 to grip the tapered seats so that the handles are held in adjusted position by friction.

With the described construction by setting the handle 178, the position of the loose collar 172 of the valve operating rod may be determined through the tubular shaft 177, arm 176 and link 175. Thus the maximum opening of the throttle valve may be determined since until the pressure of the spring 174 is overcome the sleeve 172 remains a fixed distance from the sleeve 168. When, however, the water pressure within the circulating system and more particularly within the chamber 160 rises sufficiently to partially compress the spring, the butterfly valve will be correspondingly and automatically adjusted to partially shut off the fuel supply. As heretofore pointed out, the pressure in the chamber 160 depends upon the rapidity of motion of the pump and hence of the motor. It follows that the throttle will remain in the position to which it is adjusted by hand until a certain maximum speed of the engine and pressure of the water circulation is attained and when that limit is exceeded the throttle valve will be closed against the pressure of the spring.

The exhaust of the motor does not differ essentially from that commonly employed except in that the waste gases or a portion thereof are led by a conduit 185 to a point just in advance of the engagement of the bull pinion with the internal gear on each side of the machine. At this point the gases are directed into the bite of the gear and pinion and serve to blow out and expel any foreign substances which might otherwise cause excessive wear of the gearing, and to lubricate these parts with the oil contained in the spent gases. The pipes 185 are of course two in number and branch from the common exhaust manifold 186 of the engine.

The particular form of clutch mechanism which we prefer to employ is shown in Figs. 4, 16, 17, 18 and 19. Referring more particularly to the detail figures it will be seen that as above stated the driving member of the clutch 50 is attached directly to one face of the fly wheel and consists of an annular plate bolted to the fly wheel at 187. The crank shaft 96 projects beyond its attachment to the fly wheel and is reduced at 188 where it receives a collar 190 to which is secured the driven member of the clutch. The collar is bushed at 190ª and a ball bearing 206 between the bushing and collar 205 on the shaft receives the end thrust between the shaft and the driven clutch member. The latter comprises a spider 191 bolted to collar 190 at 192 and having an annular face registering and adapted to come into contact with the inner face of the driving clutch member 50. An annulus 193 is mounted to engage the outer face of the driven clutch member 50, it being supported for this purpose from the spider 191 by headed pins 194 extending through said annulus and spider respectively. The degree of separation of these driven clutch members is limited by the heads 195 and nuts 196 upon the pins 194 and these members are normally pressed toward each other and toward the intermediate driven clutch member by springs 197 which are compressed between the heads of the pins and the adjacent face of the spider. The spider and annulus may, if desired, be provided with suitable friction material for engaging the intermediate driving clutch member and under normal conditions clamp the latter and rotate with it. When, however, it is desired to open or unship the clutch, this may be accomplished by means of the levers 198 which are pivoted at 199 to ears 200 cast upon the spider. The shorter arms 202 of these levers engage adjustable screw studs 201 projecting from the annulus 193 and their longer arms 203 are adapted to be engaged by a collar 204 to force them inwardly toward the fly wheel and cause the shorter arms of said levers to bear upon the screw studs 201 and so force the spider and annulus apart and away from the intermediate clutch member (see Fig. 20). It should be observed that both the driven clutch members are free to have axial movement so that when the levers are operated neither bears with any force upon the driven clutch member. This movement of course is very slight.

In Figs. 4 and 19 is shown a driven shaft 207 which extends through the transmission casing and to the rear of the machine for a purpose which will presently appear. This shaft is connected at its forward end to the driven clutch member by a well known means comprising, in addition to said collar 190, a collar 208 which is pinned to said shaft 207 and an intermediate member 209, there being a diametrical tongue and groove connection 210 between said collar 208 and intermediate member 209 and a somewhat similar tongue and groove connection 211 between said intermediate member and the collar 190, the matching of the parts being sufficiently loose to take care of any slight lack of alinement between the crank shaft and the driven shaft 207.

The collar 204, above referred to, for operating the clutch levers surrounds the collar 208, but is axially movable with reference thereto, and is operated by a forked lever 212 which is pivoted at 213 to a fixed part of the machine (see Figs. 4, 19 and 21), and to the collar 204 at opposite points thereof. Intermediate its ends this lever is provided with an anti-friction roller 214 which is borne upon by an eccentric cam 215 rigidly secured to a pivoted pedal 216, said pedal and cam being respectively keyed or pinioned upon a sleeve 217 (see Figs. 21 and 22). An inspection of these figures will show that this sleeve carrying the pedal 216 and the cam is mounted in bearings 219 and 220 in a cast plate 221 forming a part of the machine frame and bridging the trough-shaped body member 21 at this position.

The shaft 207 which, as above stated, is driven through the intermediary of the clutch by the crank shaft of the engine, extends through the partitions or bridges 31, 32, forming the support for the transmission to be presently described, and through the rear wall 30 of the body member to a point beyond the same where it is provided with a handle 236 for cranking or turning over the engine. A cast metal housing 237 (see Figs. 4 and 12) surrounds shaft 207 at this point being provided with a roller bearing 238 and thrust bearing 239 about the shaft and bolted or otherwise secured to the rear wall 30 of the body member. Beyond the housing the shaft is provided with the usual clutch member 240 for the handle. Within the housing a bevel gear 241 is loosely mounted upon the shaft and formed on its inner end with a suitable clutch face 243 for engaging a clutch sleeve 242 keyed upon the shaft for axial movement relative thereto and rotary movement therewith. A shifting fork 244 is operated by handle 245 to control the position of the clutch sleeve with reference to the bevel gear, to throw the latter into and out of engagement with shaft 207. A counter shaft 246 is mounted in bearings 247, in a cast sleeve 248 secured to housing 237 at right angles thereto, a thrust bearing 249 transmitting the end thrust of said countershaft to said sleeve, and said countershaft has pinned to its inner end a bevel gear 250 engaging bevel gear 241 above mentioned, and on its outer end a belt pulley 25' which may be used to drive other mechanisms. Normally the clutch sleeve 242 will be out of engagement with pinion 241 and the countershaft will accordingly be stationary, the drive shaft revolving loosely within said pinion, but when it is desired to drive other machinery from the tractor the clutch sleeve is thrust into engagement with the gear and the countershaft with its pulley revolved. At such times, of course, the driving connection to the ground wheels through the transmission is broken.

We will now proceed to describe the particular form of transmission embodied in our improved tractor, with reference more particularly to Figs. 4, 5, 21, 23 and 24. The shaft 207 is provided with roller bearings 251, 251 within bosses formed upon the transverse partitions 31, 32 and two spur gears 252, 253 of different diameters are mounted thereon between said partitions but spaced apart for a purpose which will appear. Beneath the shaft 207 and parallel thereto is mounted a short countershaft 254, which is likewise journaled in housings 255, 256, but in addition is provided with an end thrust bearing 256ª to resist the endwise thrust due to the engagement of the bevel pinion 257 carried by said shaft with the driving gear 258 of the differential to be presently described. Between the transverse walls 31, 32 a double pinion 259 is splined upon the shaft 254 for axial movement thereon, the individual pinions 260, 261 of said double pinion being of different diameters to mesh respectively with the pinions 252 and 253 upon the shaft 207, accordingly as said double pinion is shifted to one end or the other of the transmission casing. Obviously by this arrangement with the same speed of the driving shaft 207, either of two speeds may be obtained in the countershaft 254 at pleasure. The means for shifting the double pinion will be presently described but in the meantime it is to be noted by reference to Figs. 3, 5, 21 and 24 that a fixed shaft 262 extends parallel to the other shafts of the transmission and has loosely journaled thereon a reversing gear wheel 263 capable of axial as well as rotary motion, which is of such length and diameter that when the double pinion is in the intermediate position in which it is shown in Figs. 3, 4 and 21, said reversing gear wheel may be axially adjusted to mesh with the pinions 252 and 260 whereby the shaft 254 may be driven in the same direction as the shaft 207 and the machine thereby reversed and caused to travel backward.

The means for shifting the double pinion and the reversing pinion are best shown in Figs. 5, 23 and 24. Upon a guide rod 264 is slidably mounted a shifting fork 265 which engages the collar connecting the members of the double pinion, and upon a similar guide rod 266 is mounted a shifting fork 267 which engages a groove 268 in the hub or collar of the reversing pinion 263.

Above the sleeves 269, 270, encircling the respective guide rods, the shifting forks are formed with T-shaped cross heads 271, 272 for engagement by an operating lever 273 (see Figs. 23 and 24). The cross heads are arranged in the same horizontal plane, and when the shiftable gears of the transmission are in their normal intermediate position, are opposite each other with their U-shaped notches or depressions 274 in register. The handle 273 for shifting the forks is not only capable of a backward and forward oscillation to shift the gears longitudinally but also has a sidewise rocking movement by reason of the ball and socket mounting 275 in the frame of the machine, which latter motion is for the purpose of engaging either of the cross heads 271, 272 at the will of the operator. For this purpose the lower end of the lever 273 is semi-cylindrical, as shown in dotted lines at 276 (Fig. 23) and adapted to completely enter the notch or depression in either of the cross heads and, when in engagement therewith, to move the corresponding shifting fork. Normally, however, the lever is held in an intermediate position and in partial engagement with each cross-head by springs 277, 277 which, under the circumstance likewise enter the notches on either side of the end of the lever and normally lock the shifting forks from movement. The lower ends of these springs are provided with rounded bosses or buttons 278, 278 (see dotted lines, Fig. 24) which project inwardly and partially enter and engage the edges of an opening 273' in the lower end of the lever 273. Thus these springs not only serve to prevent accidental movement of the shifting forks but also to yieldingly hold such lever in central position and prevent sidewise oscillation thereof.

When the operator desires to shift either the double gear or the reversing gear he moves the lever to throw its lower end into complete engagement with the cross head of the shifting fork to be moved. The lateral movement is sufficient to not only disengage the lever completely from the other cross head but to throw the spring against which it is brought to bear out of the corresponding notch in the crosshead, thereby permitting the shifting fork to be moved upon the proper actuation of the lever, which may then be swung longitudinally of the machine to shift the fork with which it is engaged and hence the reversing pinion or double gear to which the fork pertains. The rounded surfaces of the buttons cause the latter to act as impositive locks holding the lever only until there is a fair degree of hand pressure which causes it to be released. The rounding surface of the button also permits the spring after it has been thrust laterally out of the notch in the cross head being moved to bear upon the outer surface of said cross head until it ultimately engages one of the openings 279, 279 located respectively near the ends of the cross heads, and when this engagement takes place the cross head is yieldingly locked against further movement, the openings being so located that the locked positions correspond respectively to the end positions of the cross head. The movement of the shifting forks is so limited that the lever, in moving one of them, does not clear the crosshead of the other, and therefore after one of the cross heads has been displaced by the lever the latter cannot escape the same or operate the other cross head until it has first returned the cross head already operated to its intermediate position. This is of advantage as it insures the proper location of the gears at all times.

The differential mechanism is best shown in Fig. 26, and comprises as usual, in addition to the driving gear above mentioned and the spider upon which it is mounted, sectional shafts driven from the driving gear by pinions upon the spider engaging beveled gears on the ends of said shafts, which shaft sections carry at their outer ends the bull pinions 47 for driving the tractor wheels. The mechanism is mounted in the frame of the engine by means of roller bearings 287 which are contained in housings 287$^a$ and immediately surround the respective shaft sections. Each housing is bolted at 287$^b$ to a flange ring 287$^c$, which extends through and is secured to the vertical wall of the trough-like body member of the tractor by bolts or rivets passing through the flanges 287$^d$, or in any other suitable manner. The bearing is or may be of any usual or approved construction and as shown, comprises in addition to the rollers and housings above mentioned, bushings 287$^e$ and 287$^f$ for the housing and shaft respectively, a dirt excluding washer 287$^g$ at the inner end of said housing, a similar washer 288 at the outer end of said housing secured by an annular plate 288$^a$, and a supplemental washer 288$^b$ secured by a second plate 288$^c$. The bushing on the shaft is secured in place by a screw 288$^d$. The shaft sections are hollow throughout their length and together with the differential spider are rotatably mounted upon or surround a floating shaft 282, the main function of which is to sustain the endwise pressure upon the differential shaft sections. For this purpose it is provided, as shown, with washers 282$^a$ and nuts 282$^b$, the former of which engage the outer ends of the hollow shaft sections and the outer faces of the bull pinions, and the latter of which are screwed upon the reduced threaded ends 282$^c$ of such shaft. By this construction, as will be readily seen, no strain is imposed upon the frame of the tractor by reason of axial pressure upon the shaft sections. At their inner ends the shaft sections are enlarged at 283$^a$ and counterbored at 283$^b$ for the reception of the ends of the hub 289$^a$ of the differential spider. Said shaft sections are also formed with annular flanges 295 to which are bolted respective beveled gears 285, a brake drum 294 being interposed between each said flange and beveled gear and secured in position by the bolts 283ᵈ passing through said flange and drum and the flange formed upon the beveled gear. As shown in Fig. 26, the last named element is formed with a neck which surrounds the enlargement 283ᵃ of the hollow shaft section and terminates in the securing flange referred to above. The two shaft sections are substantially identical in all of the features mentioned above including the beveled gears which latter are adapted to be engaged and revolved by idler pinions 292 mounted upon the differential spider between said gears. The spider comprises the hub 289ᵃ above mentioned, the ends of which project into the countersunk inner ends of the shaft sections and a rim 289ᵇ between which and the hub the idler pinions are mounted. For this purpose the hub is formed with a number of radial bores 290 depending upon the number of idler pinions employed, which bores are in register with similar bores in the rim of the spider and each idler pinion is revolubly mounted upon an arbor 291 driven through an opening in the rim and into the registering opening in the hub in which latter it is secured by a pin 291ᵃ. The rim of the spider is formed with an outwardly extending flange 293 to which is bolted the driving gear 281 of the differential heretofore mentioned. To those familiar with constructions of this nature it will be unnecessary to state the operation of the differential, but it may be pointed out that the shaft sections and differential spider are free to revolve with respect to the shaft 282 but that ordinarily the latter will turn with said shaft sections except when there is relative rotation between the latter.

In order to support the differential gear 281 against the side thrust of the pinion 280 and to sustain the latter in position, the shaft 254 carrying pinion 280 is mounted in roller bearings in a casting or forging 299 attached to the transverse partition or bridge 33 by suitable bolts 299ᵃ (see Fig. 27), and this mounting also supports an anti-friction roller 297 which bears upon the rear face 281ᵃ of the differential gear. Said roller is journaled upon the stub shaft 298 by means of the roller bearing 305 and secured thereon between the enlarged portion 298ᵃ of the shaft and the nut 304. The enlarged portion 298ᵃ is threaded for a purpose which will appear and mounted in a split bearing, which is likewise threaded, half of the bearing being formed integral with the mounting 299 and the other formed as a cap 301 secured to said mounting by screw bolts 302. In order to provide for taking up wear or other adjustment the bearing face 281ᵃ is conical and the roller 297 tapered to correspond therewith, the mounting of the stub shaft 298 being adapted for ready axial adjustment of the roller by reason of the thread upon the enlarged end thereof.

The two brake drums 294, 294 are provided on the differential in order to facilitate independent action of the shaft sections, since by reason of this duplicate construction it is possible to lock one of the shafts by application of the brake and apply all the power of the motor to the other section. The brake controlling mechanism is best shown in Figs. 21 and 22. As heretofore stated, the shaft 217 constitutes a part of the clutch operating means is made hollow and within the same is journaled a solid shaft 218 to which is secured at one end an operating pedal 224 and at the other end an arm 223, to which latter is pivoted one end of a connecting rod 225, the other end of which is adjustably connected to a pivoted brake operating arm 226. The brake band 228 coöperating with one of the drums 294 is attached at one end by a pin 229 to said brake operating arm, and at its other end is adjustably connected to said arm by a bolt 230 passing through a shoulder on said arm and through a block 231 upon an end of said strap, the other end of the bolt being provided with the usual nuts 232. A spring 233 surrounding the rod 225 and compressed between a collar 235 thereon and a washer 234 supported by a partition 31 yieldingly holds the brake mechanism in inoperative position but is overcome by the pressure of the foot upon the pedal when it is desired to apply the brake. The brake pedal 224' for the other brake drum is mounted upon a short shaft 221' to which is connected the forward end of a connecting rod 225', the rear end of which operates an arm and brake band similar in all respects to that above described but engaging the other brake drum. As shown in Fig. 22, the brake pedals are arranged so close together that they may be operated simultaneously with one foot, if desired, and when so operated arrest the motion of the machine as a whole. But they may be also operated independently where it is desired to overcome side draft or for the purpose of assisting in making short turns by reason of their independent action on the differential above described.

In the modified construction shown in Fig. 29, the differential shaft with its bull pinions is located forward of the rear wheels and the bull pinions 47' in exerting a downward drive on the rims of the traction wheels at this point, tend to raise themselves and thereby the rear end of the tractor body and to reduce in this manner the load upon the rear axle construction. In this form of the engine the transmission is preferably disposed in the rear of the differential mechanism which is interposed between the same and the fly wheel 44 of the engine. In other respects this construction is substantially the same as that previously described.

As above mentioned, the tractor body need not be made U-shaped in cross section or of a single sheet of metal, though this is the preferred form but it may be built up of a number of plates or given a rectangular form, if preferred, one instance of such a rectangular form being shown at 21ᵃ in Fig. 28 of the drawings.

We claim:

1. In a tractor engine, a frame comprising a continuous hollow body member of sheet metal bent transversely into U-shape forming a support for and partially inclosing the mechanism of the tractor.

2. In a tractor engine, a frame comprising a continuous trough-shaped hollow body member of sheet metal bent transversely into U-shape forming a support for the mechanism of the tractor and partially inclosing the same.

3. In a tractor engine, a frame comprising a longitudinal trough-shaped body member of sheet metal bent transversely into U-shape formed from a continuous sheet of metal constituting a support for and partially inclosing the operating mechanism of the tractor.

4. In a tractor engine, a frame comprising a hollow longitudinal trough-shaped body member of sheet metal bent transversely into U-shape with an inclined bottom constituting a support for and partially inclosing a mechanism of the tractor.

5. In a tractor engine, a frame comprising a longitudinal trough-shaped body member of sheet metal bent transversely into U-shape, and a casting secured to the forward end of said body member and forming a bearing for the steering head.

6. In a tractor engine, a frame comprising a hollow, trough-shaped longitudinal body member of sheet metal bent transversely into U-shape having an inclined bottom and a series of transverse partitions extending across the same and forming therewith a series of oil pockets.

7. In a tractor engine, a frame therefor comprising a trough-shaped longitudinal body member of sheet metal bent transversely into U-shape, a casting to which the front edge of said member is secured, and a steering head journaled in the casting.

8. In a tractor engine, a frame comprising a longitudinal hollow trough-shaped body member of sheet metal bent transversely into U-shape and a casting secured in the front end of the body member and having a transverse web for partially closing the front end of said body member, and a steering head revolubly mounted in said casting.

9. In a traction engine, a frame comprising a trough-shaped body member of sheet metal bent transversely into U-shape, a bridge spanning the body member and resting upon the upper edges thereof, motors mounted upon the bridge, guide and traction wheels connected to the body and connections from the motor to the traction wheels for driving the latter.

10. In a tractor, a frame comprising a trough-like body member, a bridge spanning the body member resting upon the upper edges of the sides thereof and hinged to one of said edges and an engine cylinder carried by the bridge, the latter having an opening in register with said cylinder, a crank shaft carried by the bridge below the cylinder, a piston in said cylinder and a connection therefrom to the crank shaft extending through said opening.

11. In a tractor, a frame comprising a trough-like body member, a bridge spanning the body member and resting upon the upper edges of the side walls thereof, said bridge comprising a horizontal plate, bearings supported by said bridge, engines mounted upon said plate and a crank shaft driven by the engines and mounted in the bearings.

12. In a tractor, a frame comprising a trough-shaped body member, a bridge spanning the same resting upon the upper edges of the side walls thereof and comprising a horizontal base plate, and transverse webs, bearings supported by the latter, engines mounted on the base plate, a crank shaft journaled in the bearings and connections from the engines to the crank shaft.

13. In a tractor, a frame comprising a trough-shaped body member, a bridge spanning and resting upon said trough-shaped body member, a motor carried by the bridge, shaft-bearings carried by the bridge, each including a relatively fixed member forming a half bearing, a pillow block forming the other half bearing having an inclined under surface, a wedge block having an inclined upper surface, means for adjusting the wedge block horizontally to adjust the pillow block, and a crank shaft mounted in said bearings.

14. In a tractor, a frame comprising a trough-shaped body member, a bridge spanning and resting upon said trough-shaped body member, a motor carried by the bridge, shaft-bearings carried by the bridge each including a relatively fixed member forming a half bearing, a pillow block forming the other half bearing having an inclined under surface, a wedge block having an inclined upper surface, a supporting plate beneath the wedge block, means for adjusting the wedge block horizontally to adjust the pillow block, and a crank shaft mounted in said bearings.

15. In a tractor, a body member having longitudinal parallel supports, a bridge comprising a base plate, inclined side plates and transverse webs, bearings formed integral with said webs and recessed on their under faces to receive journal members, a pillow block coöperating with each bearing and correspondingly grooved to receive between it and the bearing the journal member and being vertically adjustable, a wedge block supporting the pillow block and adjustable transversely of the bearing, contacting faces of the pillow and bearing block being inclined, means to adjust the bearing block transversely of the bearing, motors mounted upon the base plate and a crank shaft journaled in the bearing and driven by the motors.

16. In a tractor engine, a longitudinal trough-like body member, a transverse wall 29 at one end thereof, a bridge spanning the trough-like member and resting upon and hinged to one of the side walls thereof, said bridge having a front wall in register with said transverse wall of the trough-like member, motor engines mounted on the bridge, a crank shaft also mounted on the bridge and extending through an opening between said transverse wall and the front wall of the bridge.

17. In a tractor engine, a trough-like body having a forward transverse wall 29, a bridge supported upon the side walls of the trough and having a front wall the edge of which registers with the upper edge of said transverse wall, a motor engine carried by the bridge, a crank shaft also carried by the bridge, there being an opening formed in the meeting edges of the front bridge wall and the transverse wall of the body member through which the crank shaft extends and a disk mounted upon the crank shaft and closing said opening.

18. In a tractor, a frame comprising a trough-shaped body member, a bridge resting upon the walls of the body member, a transverse wall in the trough-shaped body member, a front wall formed on the bridge member and registering with the transverse wall, there being a tongue and groove connection between said walls and motor engines mounted upon the bridge.

19. In a tractor and in combination with the frame thereof, a bridge member hinged to said frame, engines and a crank shaft carried by the bridge member, a magneto mounted upon a stationary support on the frame, an arm upon the axle of the magneto armature having an open ended slot and a pin mounted upon the crank shaft and adapted to engage said slot.

20. In a tractor, a frame comprising a trough-like body member, transverse webs or partitions in the body member, a motor mounted on the body member, a crank shaft, a driven shaft substantially in line with the crank shaft, transverse partitions in the body member in which the last named shaft is mounted, transmission mechanism mounted on said partitions and a transverse shaft driven by the transmission mechanism and driving the traction wheels.

21. In a tractor, a trough-shaped body member, a rear axle comprising journals for the traction wheels and an intermediate U-shaped body extending beneath and upon opposite sides of the trough-shaped member, traction wheels mounted on the journals of the axle and means for supporting the trough-shaped member from the axle.

22. In a tractor, a trough-shaped body member, a rear axle comprising journals for the traction wheels and an intermediate U-shaped body extending beneath and upon opposite sides of the trough-shaped member, traction wheels mounted on the journals of the axle, springs intermediate the axle and body member for supporting the latter.

23. In a tractor, a trough-shaped body member, a rear axle comprising journals for the traction wheels and an intermediate U-shaped body extending beneath and upon opposite sides of the trough-shaped member, traction wheels mounted on the journals of the axle, there being vertical pockets formed in the axle, springs in the pockets and brackets attached to the body member and resting upon the springs.

24. In a tractor engine, a frame comprising a U-shaped body member, having outwardly extending brackets on the side walls thereof, a U-shaped axle extending beneath and upon opposite sides of the body member and having vertical pockets formed therein, and openings extending through the bottoms of said pockets, springs in the pockets upon which said brackets rest and bolts extending through the springs, brackets and openings in the bottoms of the pockets.

25. In a tractor engine, a frame comprising a U-shaped body member, having outwardly extending brackets on the side walls thereof, a U-shaped axle extending beneath and upon opposite sides of the body member and having vertical pockets formed therein, and openings extending through the bottoms of said pockets, springs in said pockets upon which said brackets rest, bolts extending through said brackets, springs and openings, springs upon the lower ends of said bolts, nuts upon the ends of said bolts and shoulders upon the axle between which and said nuts the last mentioned springs are compressed.

26. In a tractor, a frame comprising a trough-like body member having a rear wall, a motor engine mounted on the frame, a longitudinal shaft driven by the motor engine, traction wheels and connections between said longitudinal shaft and the traction wheels comprising a differential and a transmission mechanism, said longitudinal shaft extending beyond the rear end of the body member, a transverse shaft having a pulley thereon located beyond the end of the body member and clutch mechanism between said transverse and longitudinal shafts.

27. In a tractor engine, a longitudinal body member, a rear axle comprising a U-shaped central portion, a resilient connection between said axle and the body member, tension rods 37 and 39 connected to said axle beneath the body member and to the latter and extending respectively forwardly and rearwardly of the axle.

28. In a tractor engine, a longitudinal body member, a rear axle comprising a U-shaped central portion, a resilient connection between said axle and the body member, tension rods 37 and 39 connected to said axle beneath the body member and to the latter and extending respectively forwardly and rearwardly of the axle and a spring 41 interposed between an abutment on one of said rods and the axle.

29. In a tractor, and in combination with the body and traction wheels thereof, a differential for driving the traction wheels comprising a pair of sectional hollow shafts mounted in the body carrying at their outer ends bull pinions for driving the traction wheels and at their inner ends gear wheels, a differential spider interposed between the gear wheels of the sectional shaft and comprising a driving gear and intermediate pinions meshing with said gears and a floating shaft 282 extending entirely through the sectional shafts and differential spider and carrying abutments at its opposite ends to resist the lateral pressure of the tubular sections.

CLARENCE M. EASON.
ROBERT O. HENDRICKSON.

Witnesses:
H. H. McKee,
Franklin Hawk.